US012188537B2

(12) United States Patent
Kuroda et al.

(10) Patent No.: US 12,188,537 B2
(45) Date of Patent: Jan. 7, 2025

(54) FLUID-FILLED VIBRATION DAMPING DEVICE

(71) Applicant: SUMITOMO RIKO COMPANY LIMITED, Komaki (JP)

(72) Inventors: Kenji Kuroda, Komaki (JP); Takayoshi Yasuda, Komaki (JP)

(73) Assignee: SUMITOMO RIKO COMPANY LIMITED, Komaki (JP)

( * ) Notice: Subject to any disclaimer, the term of this patent is extended or adjusted under 35 U.S.C. 154(b) by 140 days.

(21) Appl. No.: 17/948,645

(22) Filed: Sep. 20, 2022

(65) Prior Publication Data
US 2023/0020695 A1    Jan. 19, 2023

Related U.S. Application Data

(63) Continuation of application No. PCT/JP2021/037913, filed on Oct. 13, 2021.

(30) Foreign Application Priority Data

Nov. 24, 2020 (JP) .................................. 2020-194431
Aug. 23, 2021 (JP) .................................. 2021-135726

(51) Int. Cl.
*F16F 13/18*    (2006.01)
*F16F 13/10*    (2006.01)

(52) U.S. Cl.
CPC ............ *F16F 13/18* (2013.01); *F16F 13/106* (2013.01)

(58) Field of Classification Search
CPC ...... F16F 13/105; F16F 13/106; F16F 13/107; F16F 13/18
See application file for complete search history.

(56) References Cited

U.S. PATENT DOCUMENTS 9,004,467 B2    4/2015  Satori et al.
9,347,516 B2    5/2016  Kadowaki
(Continued)

FOREIGN PATENT DOCUMENTS

GB    1581935 A  * 12/1980  ............. F16F 13/08
JP    4861843 B2    1/2012
(Continued)

OTHER PUBLICATIONS

Dec. 7, 2021 Search Report issued in International Patent Application No. PCT/JP2021/037913.
(Continued)

Primary Examiner — Thomas J Williams
(74) Attorney, Agent, or Firm — Oliff PLC

(57) ABSTRACT

A fluid-filled vibration damping device including a movable film housed within a housing space of a partition partitioning a pressure receiving chamber and an equilibrium chamber. An outer peripheral end of the movable film includes a contact part and a sealing part being respectively in contact with a pressure receiving chamber-side wall inner surface and an equilibrium chamber-side wall inner surface of the housing space. A communication passage, which communicates with a gap circumferentially between the movable film and the housing space, is provided away from the contact part in the outer peripheral end of the movable film. The outer peripheral end of the movable film will be separated from the equilibrium chamber-side wall inner surface due to a pressure differential arising between the two chambers so as to form a relief passage interconnecting the two chambers including the gap and the communication passage.

8 Claims, 6 Drawing Sheets

(56) References Cited

U.S. PATENT DOCUMENTS

| | | | |
|---|---|---|---|
| 2009/0001639 A1* | 1/2009 | Muraoka | F16F 13/106 267/140.13 |
| 2010/0201053 A1* | 8/2010 | Okumura | F16F 13/106 267/140.13 |
| 2015/0069686 A1* | 3/2015 | Okumura | F16F 13/106 267/140.13 |
| 2016/0195154 A1* | 7/2016 | Komiya | F16F 13/106 267/140.13 |
| 2016/0273610 A1 | 9/2016 | Hayashi | |
| 2021/0270344 A1 | 9/2021 | Kondo et al. | |
| 2023/0020695 A1* | 1/2023 | Kuroda | B60K 5/12 |

FOREIGN PATENT DOCUMENTS

| | | | |
|---|---|---|---|
| JP | 2013124700 A * | 6/2013 | F16F 13/08 |
| JP | 2013-231480 A | 11/2013 | |
| JP | 2014-219035 A | 11/2014 | |
| JP | 2016-169781 A | 9/2016 | |

OTHER PUBLICATIONS

Nov. 23, 2023 Office Action issued in German Patent Application No. 112021001891.4.
May 30, 2023 International Preliminary Report on Patentability issued in International Patent Application No. PCT/JP2021/037913.
Sep. 26, 2024 Office Action issued in Japanese Application No. 2021-135726.

\* cited by examiner

FLUID-FILLED VIBRATION DAMPING DEVICE

INCORPORATED BY REFERENCE

This application is a Continuation of International Application No. PCT/JP2021/037913 filed Oct. 13, 2021, which claims priority under 35 U.S.C. §§ 119(a) and 365 of Japanese Patent Application Nos. 2020-194431 filed on Nov. 24, 2020, and 2021-135726 filed on Aug. 23, 2021, the disclosures of which are expressly incorporated herein by reference in their entireties.

BACKGROUND

1. Technical Field

The present disclosure relates to a fluid-filled vibration damping device used for an automotive engine mount or the like.

2. Description of the Related Art

Conventionally, vibration damping devices used for vibration damping support of automotive power units or the like have been known. Besides, for one purpose of improving the vibration damping performance, U.S. Pat. No. 9,347,516 B2 proposes a fluid-filled vibration damping device. The fluid-filled vibration damping device has a structure in which a primary liquid chamber and an auxiliary liquid chamber filled with a fluid are partitioned by a partition. Further, in U.S. Pat. No. 9,347,516 B2, an elastic film is provided to the partition, and a vibration damping effect is exhibited by a liquid pressure-absorbing action based on the deformation of the elastic film at the time of vibration input.

Meanwhile, in the fluid-filled vibration damping device, the generation of noise due to cavitation may become a problem. Cavitation is caused by a sudden drop in the internal pressure of the primary liquid chamber. Therefore, in U.S. Pat. No. 9,347,516 B2, a relief valve for suppressing cavitation is provided in the center part of the elastic film. The relief valve opens when the internal pressure of the primary liquid chamber drops significantly to allow the fluid to flow from the auxiliary liquid chamber to the primary liquid chamber, and ameliorates the negative pressure in the primary liquid chamber, thereby suppressing cavitation.

SUMMARY

However, in the structure of U.S. Pat. No. 9,347,516 B2 in which the relief valve is provided in the center part of the elastic film, it is difficult to lengthen the peripheral length of the relief valve, and it is difficult to increase the passage cross sectional area of the relief passage that can be switched between communication and cutoff by the relief valve. This revealed a new problem that, in U.S. Pat. No. 9,347,516 B2, even if the relief valve opens, a sufficient amount of fluid cannot be flowed from the auxiliary liquid chamber to the primary liquid chamber, and the effect of ameliorating the negative pressure in the primary liquid chamber may not be sufficiently exhibited.

It is therefore one object of the present disclosure to provide a fluid-filled vibration damping device of novel structure which is able to effectively suppress cavitation.

Hereinafter, preferred embodiments for grasping the present disclosure will be described. However, each preferred embodiment described below is exemplary and can be appropriately combined with each other. Besides, a plurality of elements described in each preferred embodiment can be recognized and adopted as independently as possible, or can also be appropriately combined with any element described in other preferred embodiments. By so doing, in the present disclosure, various other preferred embodiments can be realized without being limited to those described below.

A first preferred embodiment provides a fluid-filled vibration damping device comprising: a pressure receiving chamber; an equilibrium chamber; a partition partitioning the pressure receiving chamber and the equilibrium chamber; and a movable film housed within a housing space formed in the partition, an outer peripheral end of the movable film including a contact part being in contact with a pressure receiving chamber-side wall inner surface of the housing space partially in a circumferential direction, and a sealing part being in contact with an equilibrium chamber-side wall inner surface of the housing space over an entire circumference, wherein the outer peripheral end of the movable film is supported by the partition, a gap is provided between an outer circumferential surface of the movable film and an inner circumferential surface of the housing space that are opposed to each other, in the outer peripheral end of the movable film, a communication passage communicating with the gap is provided at a position away from the contact part being in contact with the pressure receiving chamber-side wall inner surface of the housing space, and the outer peripheral end of the movable film is configured to be separated from the equilibrium chamber-side wall inner surface of the housing space due to a pressure differential arising between the pressure receiving chamber and the equilibrium chamber such that a relief passage through which the pressure receiving chamber and the equilibrium chamber are held in communication is formed including the gap and the communication passage.

According to the fluid-filled vibration damping device structured following the present preferred embodiment, the relief passage that opens when the internal pressure of the pressure receiving chamber drops and interconnects the pressure receiving chamber and the equilibrium chamber is formed. With this configuration, the drop in the internal pressure of the pressure receiving chamber is quickly reduced by the inflow of the fluid from the equilibrium chamber to the pressure receiving chamber through the relief passage. Thus, generation of cavitation due to the significant drop in the internal pressure of the pressure receiving chamber is prevented, thereby preventing noise or the like due to cavitation.

The relief passage is formed including the communication passage extending between the outer peripheral end of the movable film and the pressure receiving chamber-side wall inner surface of the housing space, and the gap formed between the outer circumferential surface of the movable film and the inner circumferential surface of the housing space, and is located on the outer peripheral portion of the housing space. Therefore, it is easy to set the length of the relief passage in the circumferential direction to be long, and it is possible to reliably obtain a large passage cross sectional area of the relief passage, without requiring an increase in size of the fluid-filled vibration damping device. With this configuration, the drop in the internal pressure of the pressure receiving chamber can be quickly dispelled by the fluid flow through the relief passage, thereby effectively preventing cavitation.

In the normal vibration input state where cavitation does not create a problem, the sealing part of the movable film is in contact with the equilibrium chamber-side wall inner surface of the housing space, so that the relief passage is closed and the short circuit between the pressure receiving chamber and the equilibrium chamber through the relief passage is prevented. Therefore, at the time of normal vibration input, the internal pressure fluctuations of the pressure receiving chamber are efficiently induced, thereby excellently exhibiting vibration damping effect due to flow action of the fluid, the liquid pressure-absorbing action of the movable film, and the like.

A second preferred embodiment provides the fluid-filled vibration damping device according to the first preferred embodiment, wherein the outer peripheral end of the movable film includes a plurality of elastic protrusions protruding toward a side of the pressure receiving chamber, the elastic protrusions being arranged in the circumferential direction, the elastic protrusions are in contact with the pressure receiving chamber-side wall inner surface of the housing space of the partition to form the contact part, and the communication passage is formed circumferentially between the elastic protrusions.

According to the fluid-filled vibration damping device structured following the present preferred embodiment, the contact part comprises the elastic protrusion. Thus, for example, depending on the deformation rigidity and the like of the elastic protrusion or the movable film, displacement of the outer peripheral end of the movable film toward the pressure receiving chamber side is allowed by compression of the elastic protrusion, so that it is also possible to form the relief passage by, for example, the sealing part being separated from the equilibrium chamber-side wall inner surface of the housing space over approximately the entire circumference in the circumferential direction. Since the plurality of elastic protrusions are provided in the circumferential direction of the movable film, it is also possible to, for example, adjust the spring constant of the elastic protrusions by the circumferential width dimension, spacing, and the like of the elastic protrusions, so as to set a threshold value of the drop in the internal pressure of the pressure receiving chamber for opening the relief passage.

A third preferred embodiment provides the fluid-filled vibration damping device according to the second preferred embodiment, wherein due to the pressure differential arising between the pressure receiving chamber and the equilibrium chamber acting on the movable film, the sealing part of the outer peripheral end of the movable film is configured to be separated from the equilibrium chamber-side wall inner surface of the housing space circumferentially between the elastic protrusions such that the relief passage is manifested while maintaining a state of contact between the pressure receiving chamber-side wall inner surface and the elastic protrusions and a state of contact between the equilibrium chamber-side wall inner surface and the sealing part in the housing space at portions where the elastic protrusions are formed.

According to the fluid-filled vibration damping device structured following the present preferred embodiment, for example, depending on deformation rigidity and the like of the elastic protrusion or the movable film, when the internal pressure of the pressure receiving chamber drops, at the position where the elastic protrusions are formed in the outer peripheral end of the movable film, the elastic protrusions and the sealing part maintain respective states of contact with the pressure receiving chamber-side wall inner surface and the equilibrium chamber-side wall inner surface of the housing space, while circumferentially between the elastic protrusions in the outer peripheral end of the movable film, by the sealing part being separated from the equilibrium chamber-side wall inner surface, it is also possible to form the relief passage. Specifically, depending on deformation rigidity and the like of the elastic protrusion or the movable film, as described later in the first practical embodiment, it is also possible to form the relief passage by the sealing part being separated from the equilibrium chamber-side wall inner surface over approximately the entire circumference in the circumferential direction, and as described in the present preferred embodiment and as described later in the third practical embodiment, it is also possible to form the relief passage by the sealing part being separated from the equilibrium chamber-side wall inner surface circumferentially between the elastic protrusions. That is, for example, in the fluid-filled vibration damping device according to the second preferred embodiment as well, it is possible to form the relief passage in an appropriate preferred embodiment depending on deformation rigidity and the like of the elastic protrusion or the movable film, thereby improving the degree of freedom in designing the elastic protrusion and the movable film, and hence the fluid-filled vibration damping device.

A fourth preferred embodiment provides the fluid-filled vibration damping device according to the second or third preferred embodiment, wherein the elastic protrusions have a tapered shape contracting toward a protruding distal end.

According to the fluid-filled vibration damping device structured following the present preferred embodiment, the change of the spring constant due to the compression of the elastic protrusion can be made non-linear. Therefore, when the internal pressure of the pressure receiving chamber significantly drops, it is possible to prevent the communication passage from being blocked due to the elastic protrusion being completely crushed, thereby preventing the relief passage from being unintentionally blocked.

The fifth present preferred embodiment provides the fluid-filled vibration damping device according to any one of the second through fourth preferred embodiments, wherein a protruding distal end face of the elastic protrusions comprises a spherical cap-shaped curved surface.

According to the fluid-filled vibration damping device structured following the present preferred embodiment, when the contact part is pressed against the pressure receiving chamber-side wall inner surface of the housing space, stress concentration on the surface of the contact part is avoided, thereby improving durability of the contact part. Besides, for example, in the case where a large positive pressure acts on the pressure receiving chamber so that the contact part of the movable film is separated from the pressure receiving chamber-side wall inner surface of the housing space and then the said positive pressure is canceled so that the contact part comes into contact with the pressure receiving chamber-side wall inner surface of the housing space, the striking noise will be reduced.

A sixth present preferred embodiment provides the fluid-filled vibration damping device according to any one of the first through fifth preferred embodiments, wherein the partition includes a plurality of concave grooves opening onto an outer peripheral portion of the pressure receiving chamber-side wall inner surface in the housing space, the outer peripheral end of the movable film and the pressure receiving chamber-side wall inner surface of the housing space are in contact with each other at a portion circumferentially away from the concave grooves, and the communication passage is formed by the concave grooves.

According to the fluid-filled vibration damping device structured following the present preferred embodiment, by forming the concave grooves on the pressure receiving chamber-side wall inner surface of the housing space, the communication passage can be formed by the concave grooves at the position away from the contact part without providing a protrusion or the like at the outer peripheral end of the movable film. When the internal pressure of the pressure receiving chamber drops, the contact part of the movable film is pressed against the pressure receiving chamber-side wall inner surface of the housing space at the position away from the concave grooves and is compressed, so that the outer peripheral end of the movable film is allowed to be displaced toward the pressure receiving chamber. Accordingly, the sealing part is separated from the equilibrium chamber-side wall inner surface of the housing space, thereby forming the relief passage.

A seventh present preferred embodiment provides the fluid-filled vibration damping device according to any one of the first through sixth preferred embodiments, wherein the sealing part includes a seal lip that protrudes toward a side of the equilibrium chamber and is continuous over the entire circumference, and the seal lip is in contact with the equilibrium chamber-side wall inner surface of the housing space over the entire circumference. Further, the present preferred embodiment may be configured such that the outer peripheral end of the movable film includes a seal lip that protrudes toward a side of the equilibrium chamber and is continuous over the entire circumference, and the seal lip is in contact with the equilibrium chamber-side wall inner surface of the housing space over the entire circumference.

According to the fluid-filled vibration damping device structured following the present preferred embodiment, the sealing part includes the seal lip. With this configuration, sealing performance can be improved by the sealing part being in contact with the equilibrium chamber-side wall inner surface of the housing space, thereby improving the vibration damping performance against the normal vibration input.

According to the present disclosure, cavitation can be effectively suppressed.

BRIEF DESCRIPTION OF THE DRAWINGS

The foregoing and/or other objects, features and advantages of the disclosure will become more apparent from the following description of a practical embodiments with reference to the accompanying drawings in which like reference numerals designate like elements and wherein.

DETAILED DESCRIPTION OF EMBODIMENTS

Hereinafter, practical embodiments of the present disclosure will be described in reference to the drawings.

Figure 1:
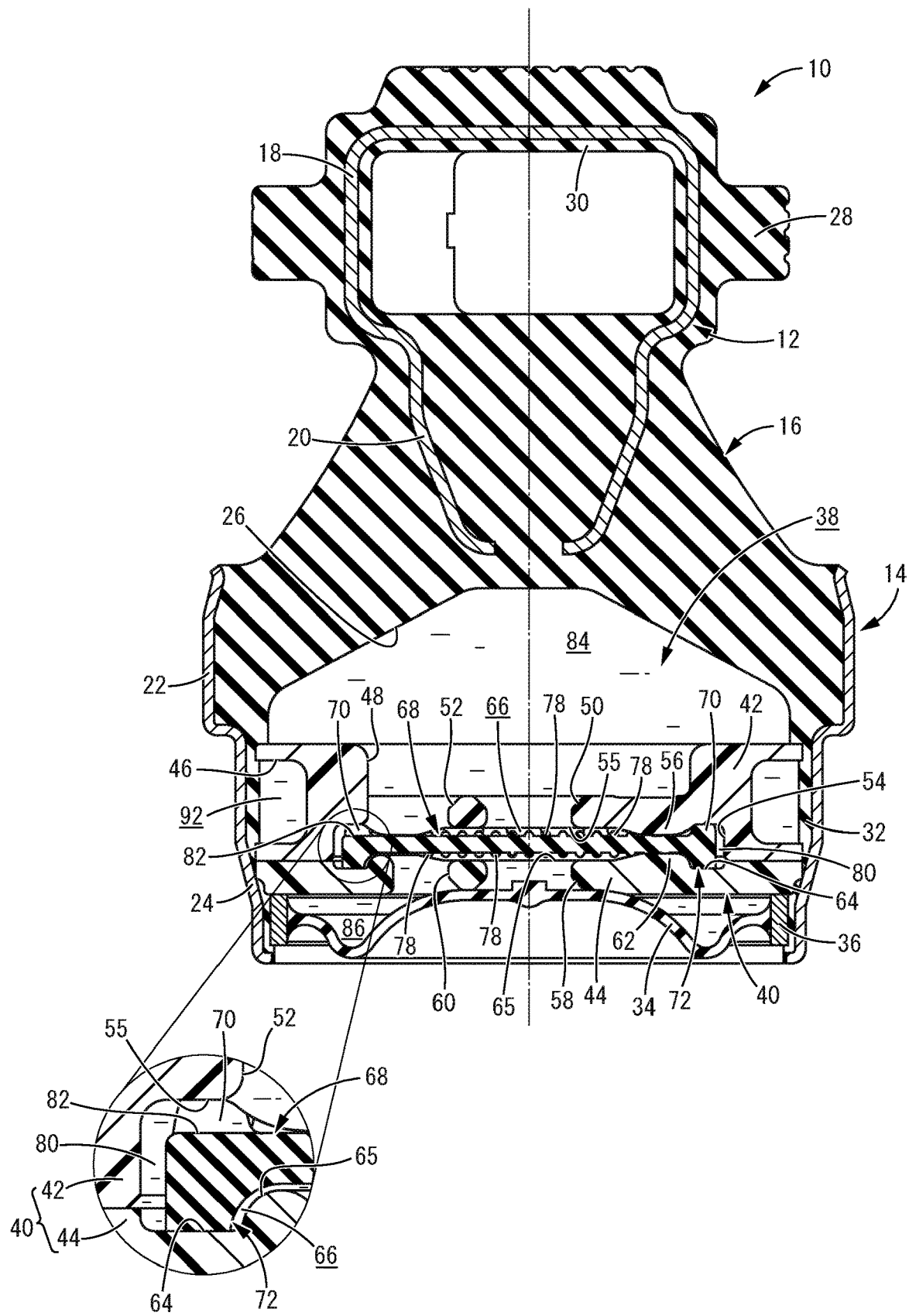
FIG. 1 is a cross sectional view showing a fluid-filled vibration damping device in the form of an engine mount as a first practical embodiment of the present disclosure, taken along line 1-1 of FIG. 3.

FIG. 1 depicts an automotive engine mount 10 as a first practical embodiment of a fluid-filled vibration damping device constructed according to the present disclosure. The engine mount 10 has a structure in which a first mounting member 12 and a second mounting member 14 are elastically connected by a main rubber elastic body 16. In the following description, as a general rule, the vertical direction refers to the vertical direction in FIG. 1 which coincides with the mount axial direction.

The first mounting member 12 integrally includes a bracket attachment part 18 having a rectangular tube shape and extending in the axis-perpendicular direction, and a tubular fastening part 20 extending downward from the periphery of a circular hole penetrating the lower wall of the bracket attachment part 18. The first mounting member 12 can be obtained by, for example, press working of a metal plate material.

The second mounting member 14 has a stepped, approximately round tubular shape, with its upper part constituting a large-diameter tube part 22 and its lower part constituting a small-diameter tube part 24 having a smaller diameter than that of the large-diameter tube part 22. The second mounting member 14 is arranged below the first mounting member 12 on approximately the same center axis, and the main rubber elastic body 16 is arranged between the first mounting member 12 and the second mounting member 14.

The main rubber elastic body 16 has an approximately frustoconical shape, with its upper part on the small-diameter side being bonded by vulcanization to the fastening part 20 of the first mounting member 12, while the outer circumferential surface of its lower part on the large-diameter side being bonded by vulcanization to the large-diameter tube part 22 of the second mounting member 14. The main rubber elastic body 16 includes a recess 26 which opens onto the lower surface and decreases in diameter upward. The recess 26 is located below the fastening part 20 of the first mounting member 12, and is located on the radial inside of the small-diameter tube part 24 of the second mounting member 14.

A stopper rubber 28 integrally formed with the main rubber elastic body 16 is fastened to the outer circumferential surface of the bracket attachment part 18 of the first mounting member 12, while a fitting rubber 30 integrally formed with the main rubber elastic body 16 is fastened to the inner circumferential surface of the bracket attachment part 18. The inner circumferential surface of the small-diameter tube part 24 of the second mounting member 14 is integrally formed with the main rubber elastic body 16, and is covered with a seal rubber layer 32 extending downward from the periphery of the recess 26.

A flexible film 34 is attached to the small-diameter tube part 24 of the second mounting member 14. The flexible film 34 is a thin rubber film having flexibility and has a slack in the vertical direction. An annular fixing member 36 is fastened to the outer peripheral end of the flexible film 34, and the fixing member 36 is fixed to the lower end part of the small-diameter tube part 24 of the second mounting member 14. By the fixing member 36 being fixed to the second mounting member 14, the flexible film 34 is arranged so as to close the lower opening of the second mounting member 14. The method of fixing the fixing member 36 to the second mounting member 14 is not particularly limited, but for example, with the fixing member 36 inserted inside the second mounting member 14, the second mounting member 14 is subjected to a diameter reduction process, whereby the fixing member 36 is fixed to the second mounting member 14. Since the seal rubber layer 32 is interposed between the small-diameter tube part 24 of the second mounting member 14 and the fixing member 36, a fluid-tight sealing is provided between the second mounting member 14 and the fixing member 36.

By the flexible film 34 being attached to the second mounting member 14 fastened to the main rubber elastic body 16, a fluid chamber 38 is defined between the opposed main rubber elastic body 16 and flexible film 34 so as to be fluid-tight with respect to the outside. The fluid chamber 38 is filled with a non-compressible fluid. The non-compressible fluid is not limited to a particular fluid or liquid. For example, water, ethylene glycol, alkylene glycol, polyalkylene glycol, silicone oil, a mixture liquid of them or the like can be adopted.

Figure 2:
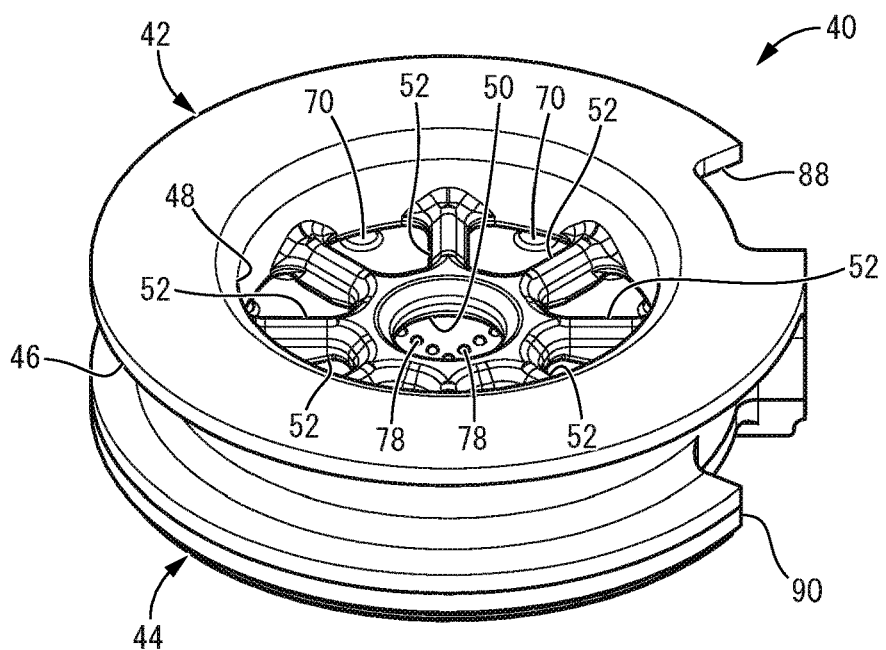
FIG. 2 is a perspective view of a partition constituting the engine mount shown in FIG. 1.
Figure 3:
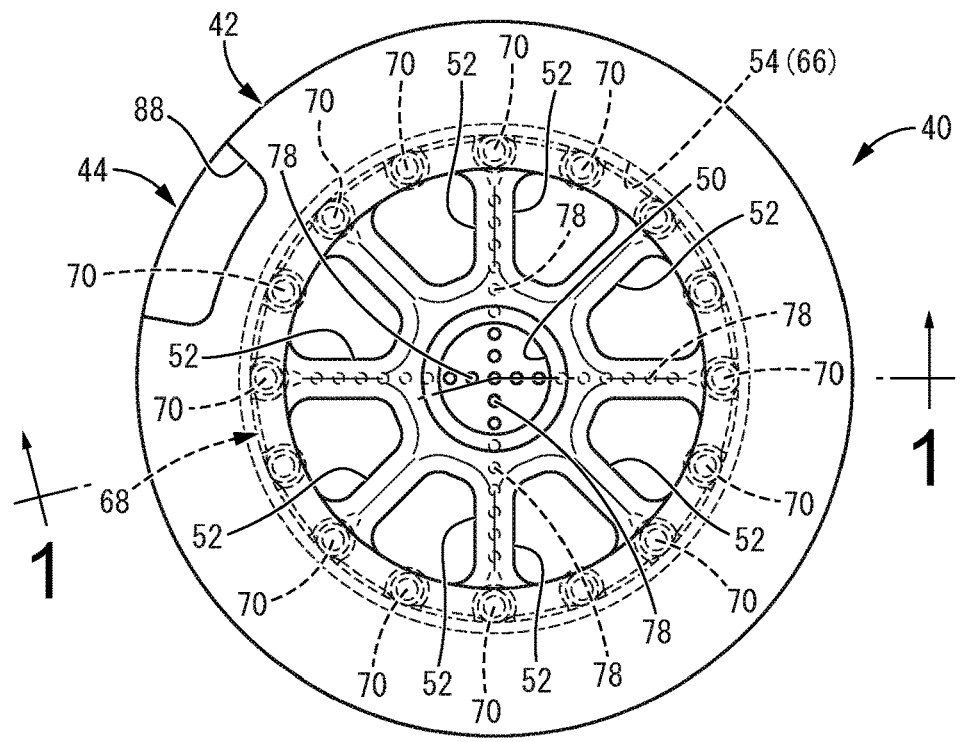
FIG. 3 is a plan view of the partition shown in FIG. 2.

A partition 40 is arranged in the fluid chamber 38. As shown in FIGS. 2 and 3, the partition 40 has an approximately circular disk shape, and includes a first partition plate 42 and a second partition plate 44.

The first partition plate 42 has a circular disk shape overall, and is a rigid member made of metal, synthetic resin, or the like. At the outer peripheral end of the first partition plate 42, a peripheral groove 46 is formed so as to open onto the outer circumferential surface and extend in the circumferential direction. In the central portion of the first partition plate 42, a circular central recess 48 is formed so as to open onto the upper surface on the radial inside of the peripheral groove 46. On the bottom wall of the central recess 48, there is formed a first central through hole 50 having a circular cross section and penetrating the center in the vertical direction. Besides, a plurality of first outer peripheral through holes 52 penetrate the bottom wall of the central recess 48 in the vertical direction on the radial outside of the first central through hole 50. In the central portion of the first partition plate 42, a circular housing recess 54 is formed so as to open onto the lower surface. The housing recess 54 is larger in diameter and shallower than the central recess 48, and the outer peripheral end of the housing recess 54 is located on the radial outside of the central recess 48. The upper wall inner surface of the housing recess 54 comprises a first wall inner surface 55. Regarding the first wall inner surface 55, the radially middle portion constitutes a first narrowing part 56 projecting downward. The first central through hole 50 and the first outer peripheral through holes 52 are formed by penetrating the common portion of the bottom wall of the central recess 48 and the housing recess 54 so as to connect the central recess 48 and the housing recess 54.

The second partition plate 44 is a rigid member like the first partition plate 42, and has an approximately circular disk shape thinner than the first partition plate 42. A second central through hole 58 having a circular cross section penetrates the central portion of the second partition plate 44 in the vertical direction. A plurality of second outer peripheral through holes 60 penetrate the second partition plate 44 in the vertical direction on the radial outside of the second central through hole 58 so as to be arranged side by side in the circumferential direction. A second narrowing part 62 projecting upward is provided circumferentially between the second outer peripheral through holes 60 in the second partition plate 44. A groove-shaped seal contact part 64 is provided on the radial outside of the second narrowing part 62 of the second partition plate 44 so as to open onto the upper surface and extend in the circumferential direction. The upper surface of the second partition plate 44, which is constituted by the seal contact part 64 and the radially inner portion with respect to the seal contact part 64, comprises a second wall inner surface 65 vertically opposed to the first wall inner surface 55 in the partition 40.

The first partition plate 42 and the second partition plate 44 are overlapped with each other in the vertical direction. By the second partition plate 44 being overlapped with the lower surface of the first partition plate 42, the opening of the housing recess 54 of the first partition plate 42 is covered by the second partition plate 44, so as to form a housing space 66 between the first partition plate 42 and the second partition plate 44. The upper wall inner surface of the housing space 66 on the side of a pressure receiving chamber 84, which will be described later, is constituted by the first wall inner surface 55 of the first partition plate 42, while the lower wall inner surface of the housing space 66 on the side of an equilibrium chamber 86, which will be described later, is constituted by the second wall inner surface 65 of the second partition plate 44. In the partition 40, the first central through hole 50 and the first outer peripheral through holes 52 penetrate the upper wall of the housing space 66 and communicate with the housing space 66, while the second central through hole 58 and the second outer peripheral through holes 60 penetrate the lower wall of the housing space 66 and communicate with the housing space 66. The first central through hole 50 and the second central through hole 58 are arranged at positions corresponding to each other in the vertical direction, while the first outer peripheral through holes 52 and the second outer peripheral through holes 60 are arranged at positions corresponding to each other in the vertical direction.

Figure 4:
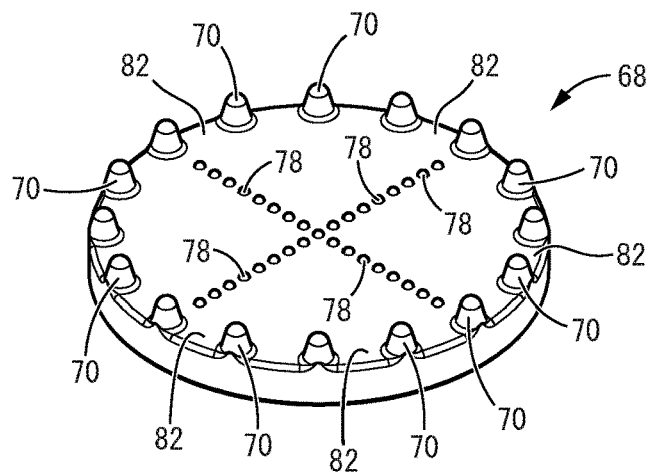
FIG. 4 is a perspective view of a movable film constituting the engine mount shown in FIG. 1.
Figure 5:
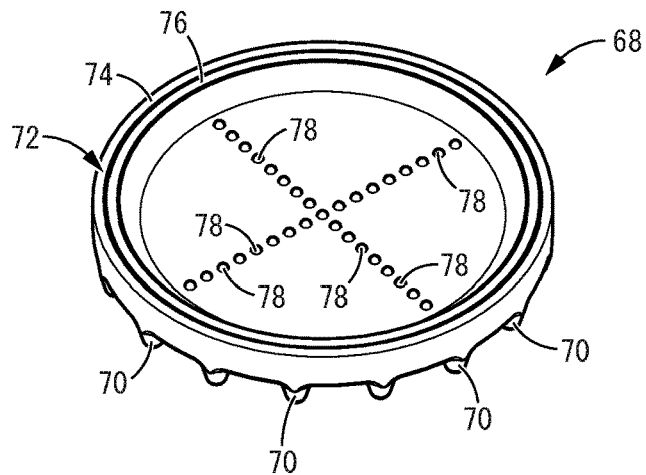
FIG. 5 is a perspective view showing the movable film of FIG. 4 at another angle.

A movable film 68 is arranged in the housing space 66 of the partition 40. As shown in FIGS. 4 and 5, the movable film 68 has a circular disk shape overall. The movable film 68 is formed of a rubber elastic body, and is allowed to undergo elastic flexural deformation in the thickness direction. Depending on the required vibration damping performance, the deformation rigidity of elastic protrusions 70 described later, or the like, a rigid plate made of, for example, metal, resin or the like may be partially or entirely embedded in the movable film 68, thereby adjusting partial or entire deformation characteristics.

Elastic protrusions 70 protruding upward are integrally formed at the outer peripheral end of the movable film 68. The elastic protrusions 70 protrude from the outer peripheral end of the movable film 68 upward, namely, toward the side of the pressure receiving chamber 84, which will be described later. The elastic protrusions 70 are provided in plurality so as to be arranged apart from one another in the circumferential direction. The elastic protrusion 70 has an approximately circular cross section. The elastic protrusion 70 has a tapered shape that gradually contracts (becomes smaller in diameter) toward the protruding distal end. The protruding distal end face of the elastic protrusion 70 may be a flat surface, a sharp-shaped convex surface, or the like. However, in the present practical embodiment, the protruding distal end face of the elastic protrusion 70 comprises a spherical cap-shaped curved surface that is convex toward the protruding distal end. The number and arrangement of the elastic protrusions 70 are not particularly limited, but in the present practical embodiment, sixteen elastic protrusions 70 are arranged side by side at approximately equal intervals in the circumferential direction.

A sealing part 72 is provided at the outer peripheral end of the movable film 68. The sealing part 72 constitutes a lower end portion of the outer peripheral end of the movable film 68. In the present practical embodiment, the sealing part 72 includes an outside lip 74 and an inside lip 76 serving as a seal lip. As shown in an enlarged manner in FIG. 6, the outside lip 74 protrudes from the outer peripheral edge portion of the movable film 68 downward, namely, toward the side of the equilibrium chamber 86, which will be described later, and has an annular shape that continuously extends in the circumferential direction. The inside lip 76 protrudes downward on the radial inside of the outside lip 74, and has an annular shape extending in the circumferential direction in parallel with the outside lip 74.

Figure 6:
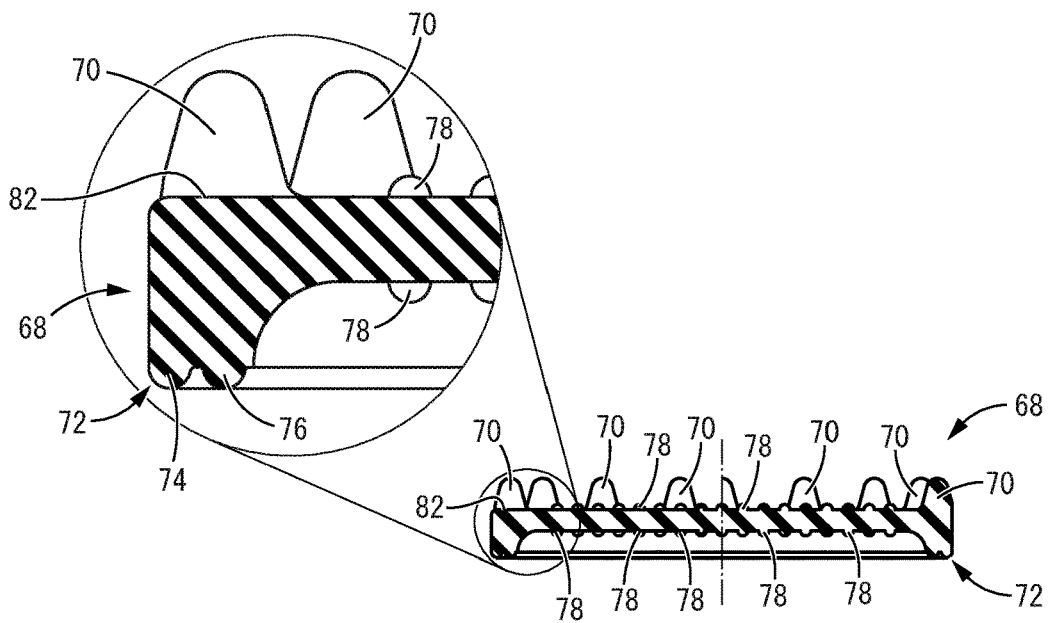
FIG. 6 is a cross sectional view of the movable film shown in FIG. 4.

In the radially inner portion of the movable film 68, a plurality of cushion projections 78 are provided on both the upper and lower surfaces. The cushion projection 78 has an approximately semispherical shape. The projecting height dimension and width dimension of the cushion projection 78 are smaller than those of the elastic protrusion 70. As shown in FIGS. 4 to 6, the cushion projections 78 of the present practical embodiment are minute projections, and a plurality of the cushion projections 78 are arranged side by side in an approximately cross shape.

As shown in FIG. 1, the movable film 68 is arranged in the housing space 66 of the partition 40. In the movable film 68, the outer peripheral end provided with the elastic protrusions 70 and the sealing part 72 is located on the radial outside of the first outer peripheral through holes 52 and the second outer peripheral through holes 60, and is arranged between the opposed first partition plate 42 and second partition plate 44. The elastic protrusions 70 are pressed against the first wall inner surface 55 of the first partition plate 42, while the sealing part 72 is pressed against the second wall inner surface 65 (the seal contact part 64) of the second partition plate 44, so that the outer peripheral end of the movable film 68 is clasped vertically between the first partition plate 42 and the second partition plate 44. Besides, the vertical dimension of the radially inner portion of the housing space 66 is larger than the vertical dimension of the radially inner portion of the movable film 68, and the radially inner portion of the movable film 68 is allowed to undergo displacement in the vertical direction accompanied by elastic deformation.

The outer diameter dimension of the movable film 68 is smaller than the inner diameter dimension of the housing space 66. In the state where the movable film 68 is arranged in the housing space 66, the outer circumferential surface of the movable film 68 and the peripheral wall inner surface of the housing space 66 are apart from and opposed to each other in the radial direction. With this configuration, an annular gap 80 extending in the circumferential direction is provided radially between the outer circumferential surface of the movable film 68 and the peripheral wall inner surface of the housing space 66. In the present practical embodiment, the gap 80 is provided over the entire circumference in the circumferential direction. However, as long as generation of cavitation is sufficiently prevented by a relief passage including the gap when the internal pressure of the pressure receiving chamber 84 drops, as will be described later, the radial gap between the outer circumferential surface of the movable film and the peripheral wall inner surface of the housing space may be partial in the circumferential direction.

In the state where the elastic protrusions 70 are pressed against the upper wall inner surface of the housing space 66, an empty space is maintained circumferentially between the elastic protrusions 70, 70 arranged adjacent to each other in the circumferential direction. The empty space between the elastic protrusions 70, 70 forms a communication passage 82 that extends between the movable film 68 and the partition 40 so as to communicate with the gap 80. In the present practical embodiment, a plurality of the communication passages 82 extend in a spoke-wise fashion, but the communication passages do not necessarily extend in the radial direction of the movable film 68, and the number of the communication passages 82 is not limited as long as they are provided in plurality. The outer peripheral end of the movable film 68 is in contact with the wall inner surface of the housing space 66 on the side of the pressure receiving chamber 84 (described later) (namely, the first wall inner surface 55) at portions where the elastic protrusions 70 are formed, while being separated from the first wall inner surface 55 at a position circumferentially away from the elastic protrusions 70. Therefore, a contact part that is in contact with the pressure receiving chamber 84-side wall inner surface 55 of the housing space 66 is formed by the elastic protrusions 70, and is partially provided in the circumferential direction. That is, in the present practical embodiment, the communication passages 82 communicating with the gap 80 are provided at the positions circumferentially away from the elastic protrusions 70, which serve as a contact part, in the outer peripheral end of the movable film 68.

The sealing part 72 is pressed against the seal contact part 64 of the second partition plate 44 over the entire circumference, so that the sealing part 72 constitutes a sealing structure for preventing the gap 80 from communicating with the second central through hole 58 and the second outer peripheral through hole 60. In the present practical embodiment, the sealing part 72 includes the outside lip 74 and the inside lip 76, and both the outside lip 74 and the inside lip 76 are pressed against the second partition plate 44 to provide a double sealing structure. However, it would also be possible to adopt a sealing structure with a single seal lip, a multiple sealing structure with three or more seal lips, and the like. Moreover, the seal lip is dispensable.

As described above, the outer peripheral end of the movable film 68 including the elastic protrusions 70 and the sealing part 72 is vertically clasped and supported by the partition 40. The radially inner portion of the movable film 68 is allowed to undergo tiny displacement in the vertical direction accompanied by flexural deformation in the housing space 66.

The partition 40 housing the movable film 68 is arranged in the fluid chamber 38 as shown in FIG. 1. The partition 40 arranged in the fluid chamber 38 extends in the axis-perpendicular direction, and the outer circumferential surface thereof is overlapped with and supported by the inner circumferential surface of the small-diameter tube part 24 of the second mounting member 14. Since the outer circumferential surface of the partition 40 is overlapped with the second mounting member 14 via the seal rubber layer 32, a fluid-tight sealing is provided between the overlapped surfaces of the partition 40 and the second mounting member 14. The method of fixing the second mounting member 14 and the partition 40 is not particularly limited. However, for example, with the partition 40 inserted inside the second mounting member 14, the second mounting member 14 is subjected to a diameter reduction process, and the inner circumferential surface of the second mounting member 14 and the outer circumferential surface of the partition 40 are pressed against each other via the seal rubber layer 32 to be fixed. By the diameter reduction process of the second mounting member 14, it is possible to perform pre-compression of the main rubber elastic body 16, attachment of the flexible film 34 to the second mounting member 14, and attachment of the partition 40 to the second mounting member 14 at once.

The fluid chamber 38 is bifurcated into upper and lower parts by the partition 40, and the pressure receiving chamber 84 and the equilibrium chamber 86 are defined. That is, the upper side with respect to the partition 40 in the fluid chamber 38 comprises the pressure receiving chamber 84 whose wall is partially defined by the main rubber elastic body 16. The lower side with respect to the partition 40 in the fluid chamber 38 comprises the equilibrium chamber 86 whose wall is partially defined by the flexible film 34. Both the pressure receiving chamber 84 and the equilibrium chamber 86 are filled with a non-compressible fluid, and internal pressure fluctuations are induced in the pressure receiving chamber 84 at the time of vibration input, while the equilibrium chamber 86 is allowed to change in volume. The non-compressible fluid is sealed in the pressure receiving chamber 84 and the equilibrium chamber 86 by, for example, performing the attachment work of the flexible film 34 and the partition 40 to the second mounting member 14 in the non-compressible fluid.

By the partition 40 being attached to the second mounting member 14, the opening of the peripheral groove 46 is fluid-tightly closed by the second mounting member 14 covered with the seal rubber layer 32, so as to form the flow path extending in the circumferential direction. One end of the said flow path communicates with the pressure receiving chamber 84 through a first communication aperture 88 formed in the first partition plate 42, while the other end thereof communicates with the equilibrium chamber 86 through a second communication aperture 90 formed in the second partition plate 44. This configuration forms an orifice passage 92 through which the pressure receiving chamber 84 and the equilibrium chamber 86 are held in communication with each other by utilizing the peripheral groove 46. In the orifice passage 92, the resonance frequency of the flowing fluid is tuned to the frequency of vibration to be damped by adjusting the ratio of the passage length to the passage cross sectional area while considering the spring of the wall of the pressure receiving chamber 84 and the like. In the present practical embodiment, the tuning frequency of the orifice passage 92 is set to a low frequency of around 10 Hz, which corresponds to engine shake.

The housing space 66 of the partition 40 communicates with the pressure receiving chamber 84 through the first central through hole 50 and the first outer peripheral through holes 52, while communicating with the equilibrium chamber 86 through the second central through hole 58 and the second outer peripheral through holes 60. Regarding the movable film 68 arranged in the housing space 66, the liquid pressure of the pressure receiving chamber 84 is exerted on the upper surface thereof, while the liquid pressure of the equilibrium chamber 86 is exerted on the lower surface thereof. Therefore, when a relative internal pressure differential occurs between the pressure receiving chamber 84 and the equilibrium chamber 86, a vertical force acts on the movable film 68, and the movable film 68 is deformed or displaced. The resonance frequency of the flexural deformation of the movable film 68 is set to the frequency of vibration to be damped which is higher than the tuning frequency of the orifice passage 92, and the movable film 68 is configured to actively deform in the resonant state by the input of the said vibration to be damped.

The gap 80 provided on the outer periphery of the movable film 68 communicates with the pressure receiving chamber 84 through the communication passage 82, the first central through hole 50, and the first outer peripheral through holes 52.

Due to the sealing structure provided by the contact between the sealing part 72 of the movable film 68 and the second wall inner surface 65 of the housing space 66, the gap 80 does not communicate with the equilibrium chamber 86, and the pressure receiving chamber 84 and the equilibrium chamber 86 are blocked by the movable film 68 without communicating with each other through the housing space 66. The sealing structure provided by the contact between the sealing part 72 and the second wall inner surface 65 is not necessarily limited to the one that completely blocks the flow of the fluid. It is acceptable as long as the sealing structure blocks such a fluid flow as to cause deterioration in the vibration damping performance at the time of normal vibration input.

The engine mount 10 of the above construction is mounted to a vehicle by, for example, the first mounting member 12 being mounted on a power unit via an inner bracket (not shown) fitted into the bracket attachment part 18, and the second mounting member 14 being mounted on a vehicle body via an outer bracket (not shown) externally fitted around the second mounting member 14.

With the engine mount 10 mounted on the vehicle, when a low-frequency, large-amplitude vibration corresponding to engine shake or the like is input in the vertical direction across the first mounting member 12 and the second mounting member 14, the pressure receiving chamber 84, whose wall is partially defined by the main rubber elastic body 16, experiences an internal pressure change. Then, based on the relative pressure differential arising between the pressure receiving chamber 84 and the equilibrium chamber 86, fluid flow is actively generated in the resonant state between the pressure receiving chamber 84 and the equilibrium chamber 86 through the orifice passage 92, thereby attaining vibration damping effect (vibration attenuating action) based on the flow action of the fluid.

At the time of input of the low-frequency, large-amplitude vibration, the deformation of the movable film 68 cannot follow the amplitude of the input vibration. Thus, the movable film 68 is substantially restrained, so that the action of absorbing liquid pressure of the pressure receiving chamber 84 due to the deformation of the movable film 68 is not sufficiently exhibited. Therefore, an internal pressure differential arising between the pressure receiving chamber 84 and the equilibrium chamber 86 is largely obtained, and the fluid flow through the orifice passage 92 is efficiently generated, thereby advantageously attaining the vibration damping effect due to the orifice passage 92. When the greatly deformed movable film 68 strikes the wall inner surfaces 55, 65 of the housing space 66 and is restrained, the minute cushion projections 78 projecting from both the front and back faces of the movable film 68 preferentially come into contact with the wall inner surfaces 55, 65 of the housing space 66. This reduces striking noise during the contact.

When a mid- to high-frequency, small-amplitude vibration corresponding to idling vibration or the like higher than the tuning frequency of the orifice passage 92 is input, the orifice passage 92 is substantially blocked by antiresonance. The movable film 68 actively undergoes flexural deformation in the resonant state in response to the input vibration, and absorbs the internal pressure fluctuations of the pressure receiving chamber 84 caused by the vibration input. This avoids marked high dynamic spring behavior due to the substantial sealing of the pressure receiving chamber 84, thereby exhibiting vibration damping effect (vibration isolation effect) due to low dynamic spring behavior.

Figure 7:
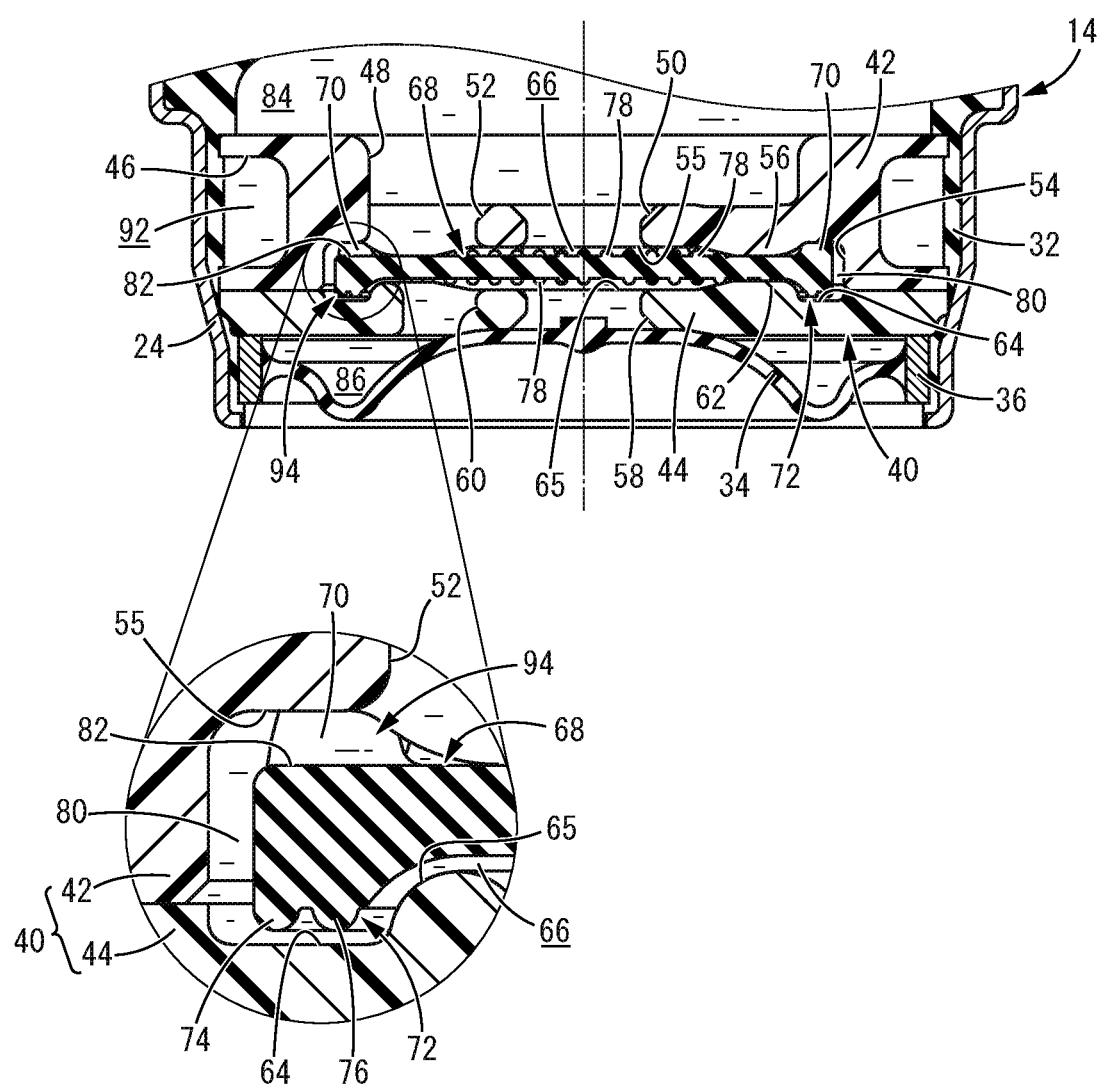
FIG. 7 is a cross sectional view of the engine mount shown in FIG. 1, showing a communicating state of a relief passage.

When the vehicle rides over a bump or the like during driving such that a vibration with markedly large amplitude is input and the internal pressure of the pressure receiving chamber 84 drops significantly, based on a relative internal pressure differential arising between the pressure receiving chamber 84 and the equilibrium chamber 86, a force toward the upper side, which is the pressure receiving chamber 84 side, acts on the movable film 68. As shown in FIG. 7, the elastic protrusions 70 of the movable film 68 are compressed and contracted in the vertical direction by the action of this force, and the lower surface of the outer peripheral end of the movable film 68 is displaced upward. Accordingly, the sealing part 72 provided at the outer peripheral end of the movable film 68 is separated upward from the seal contact part 64 constituting the second wall inner surface 65 of the housing space 66, for example, over approximately the entire circumference in the circumferential direction. In the present practical embodiment in particular, at the outer peripheral end of the movable film 68, the elastic protrusions 70 efficiently undergo compressive deformation in the vertical direction, while the deformation of the portion other than the portion forming the elastic protrusions 70 is relatively suppressed. As a result, the sealing part 72 at the outer peripheral end of the movable film 68 is displaced upward over approximately the entire circumference in the circumferential direction including the portion forming the elastic protrusions 70, and is separated from the seal contact part 64. By so doing, the gap 80 provided on the outer peripheral side of the movable film 68 communicates with the equilibrium chamber 86 through the second outer peripheral through holes 60, such that a relief passage 94 through which the pressure receiving chamber 84 and the equilibrium chamber 86 are held in communication is formed including the gap 80 and the communication passage 82. Then, the sealed fluid flows from the equilibrium chamber 86 into the pressure receiving chamber 84 through the relief passage 94, so that the drop in the internal pressure of the pressure receiving chamber 84 is promptly reduced or eliminated, thereby preventing generation of cavitation due to the drop in the internal pressure of the pressure receiving chamber 84. As a result, the occurrence of noise and vibration caused by the cavitation is prevented, thereby improving quietness and ride comfort of the vehicle.

The relief passage 94 is provided so as to wrap around the outer peripheral end of the movable film 68. Thus, in comparison with the case where the relief passage is provided in the central portion of the movable film as in the conventional structure, the length dimension in the circumferential direction is largely obtained, and the passage cross sectional area is largely obtained. With this configuration, the flow rate of the relief passage 94 is increased, so that the sealed fluid quickly flows from the equilibrium chamber 86 into the pressure receiving chamber 84, thereby rapidly reducing the negative pressure in the pressure receiving chamber 84. Besides, in the relief passage 94, the passage length is shorter than that of the orifice passage 92, and the ratio of the passage cross sectional area to the passage length is larger than that of the orifice passage 92. In the relief passage 94, flow resistance is smaller than that of the orifice passage 92, and the flow rate is largely obtained.

Since the elastic protrusion 70 has a tapered shape, the spring increases non-linearly as the amount of compressive deformation increases, so that further compressive deformation is less likely to occur. Therefore, when the internal pressure of the pressure receiving chamber 84 drops significantly, blocking of the communication passage 82 due to excessive collapse of the elastic protrusions 70 is avoided while allowing the relief passage 94 to open quickly due to the compressive deformation of the elastic protrusions 70, thereby maintaining the communicating state of the relief passage 94.

When a vibration with markedly large amplitude is input and the internal pressure of the pressure receiving chamber 84 rises significantly, the sealing part 72 is further compressed and the outer peripheral end of the movable film 68 may be displaced downward. In this case, even if the distal end face of the elastic protrusion 70 is separated from the first wall inner surface 55 of the housing space 66, since the protruding distal end face of the elastic protrusion 70 has a tapered spherical cap shape, the striking noise when coming into contact with the first wall inner surface 55 again will be reduced.

Figure 8:
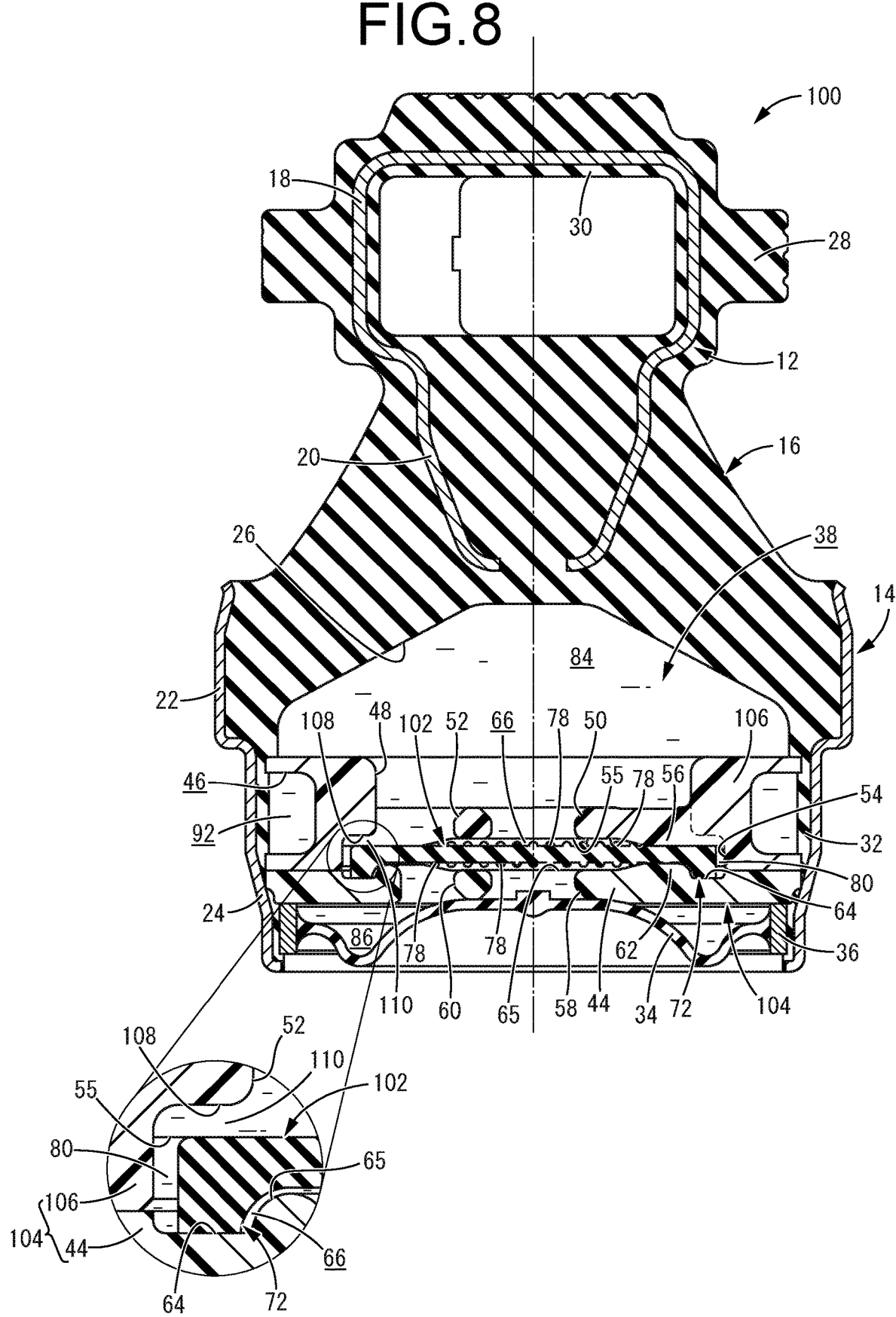
FIG. 8 is a cross sectional view showing an engine mount as a second practical embodiment of the present disclosure.

FIG. 8 depicts an automotive engine mount 100 as a second practical embodiment of a fluid-filled vibration damping device constructed according to the present disclosure. In the following description, components and parts that are substantially identical with those in the first practical embodiment will be assigned like symbols and not described in any detail.

The engine mount 100 has a structure in which a movable film 102 is arranged in the housing space 66 of a partition 104. The movable film 102 does not include the elastic protrusion 70 shown in the first practical embodiment at the outer peripheral end, and the upper surface of the outer peripheral end comprises a flat surface.

A first partition plate 106 constituting the partition 104 includes a plurality of concave grooves 108 opening onto the pressure receiving chamber 84-side wall inner surface (the first wall inner surface 55) of the housing space 66. The concave groove 108 extends in the radial direction in the outer peripheral portion of the housing space 66, and the radially inner end is opened to the first outer peripheral through hole 52. In other words, it can also be understood that the pressure receiving chamber 84-side wall inner surface (the first wall inner surface 55) of the housing space 66 includes a plurality of convex ridges extending in the radial direction and projecting downward, and the concave grooves 108 opening downward are relatively formed circumferentially between the said convex ridges. That is, the convex ridges are integrally formed with the first partition plate 106, and are rigid convex ridges. Here, the convex ridges may be elastic convex ridges. For example, it would also be acceptable that the elastic convex ridges formed separately from the first partition plate 106 are fastened later, so as to form the plurality of concave grooves 108.

The portion of the first wall inner surface 55 of the housing space 66 that is circumferentially away from the concave grooves 108 is in contact with the upper surface of the outer peripheral end of the movable film 102. With this configuration, the outer peripheral end of the movable film 102 is vertically clasped by the partition 104 at the portion circumferentially away from the concave grooves 108. Therefore, at the outer peripheral end of the movable film 102, the portion that is circumferentially away from the concave grooves 108 and is in contact with the first partition plate 106 constitutes the contact part of the present practical embodiment.

By the movable film 102 being arranged in the housing space 66, the lower openings of the concave grooves 108 are covered with the movable film 102, and a communication passage 110 extending in the radial direction is formed by the concave grooves 108. In the communication passage 110, the radially inner end communicates with the pressure receiving chamber 84 through the first outer peripheral through hole 52, while the outer peripheral end communicates with the gap 80 provided on the outer peripheral side of the movable film 102.

In the engine mount 100 constructed according to the present practical embodiment, similar to the first practical embodiment, when the internal pressure of the pressure receiving chamber 84 significantly drops due to the vibration input, the pressure receiving chamber 84 and the equilibrium chamber 86 are held in communication by the relief passage (not shown) including the gap 80 and the communication passage 110. Specifically, when the internal pressure of the pressure receiving chamber 84 significantly drops, a force toward the pressure receiving chamber 84 acts on the movable film 102 due to the relative pressure differential arising between the pressure receiving chamber 84 and the equilibrium chamber 86, and the contact part of the outer peripheral end of the movable film 102 is compressed in the vertical direction. By so doing, the outer peripheral end of the movable film 102 is displaced toward the pressure receiving chamber 84, and the sealing part 72 of the movable film 102 is separated from the seal contact part 64 constituting the equilibrium chamber 86-side wall inner surface (the second wall inner surface 65) of the housing space 66. As a result, the gap 80 communicating with the pressure receiving chamber 84 through the communication passage 110 communicates with the equilibrium chamber 86 through between the sealing part 72 and the seal contact part 64 and through the second outer peripheral through holes 60, so as to form the relief passage, through which the pressure receiving chamber 84 and the equilibrium chamber 86 are held in communication, including the gap 80 and the communication passage 110. Then, the sealed fluid flows from the equilibrium chamber 86 into the pressure receiving chamber 84 through the relief passage, thereby suppressing the drop in the internal pressure of the pressure receiving chamber 84 and preventing the generation of cavitation.

In the first practical embodiment, the communication passage 82 and the contact part are formed by providing the elastic protrusions 70 to the movable film 68 so as to form irregularities on the outer peripheral portion of the movable film 68 at the portion to be overlapped with the first wall inner surface 55. However, as in the present practical embodiment, it is also possible to form the communication passage 110 and the contact part by providing irregularities on the partition 104 at the portion clasping the movable film 102.

Figure 9:
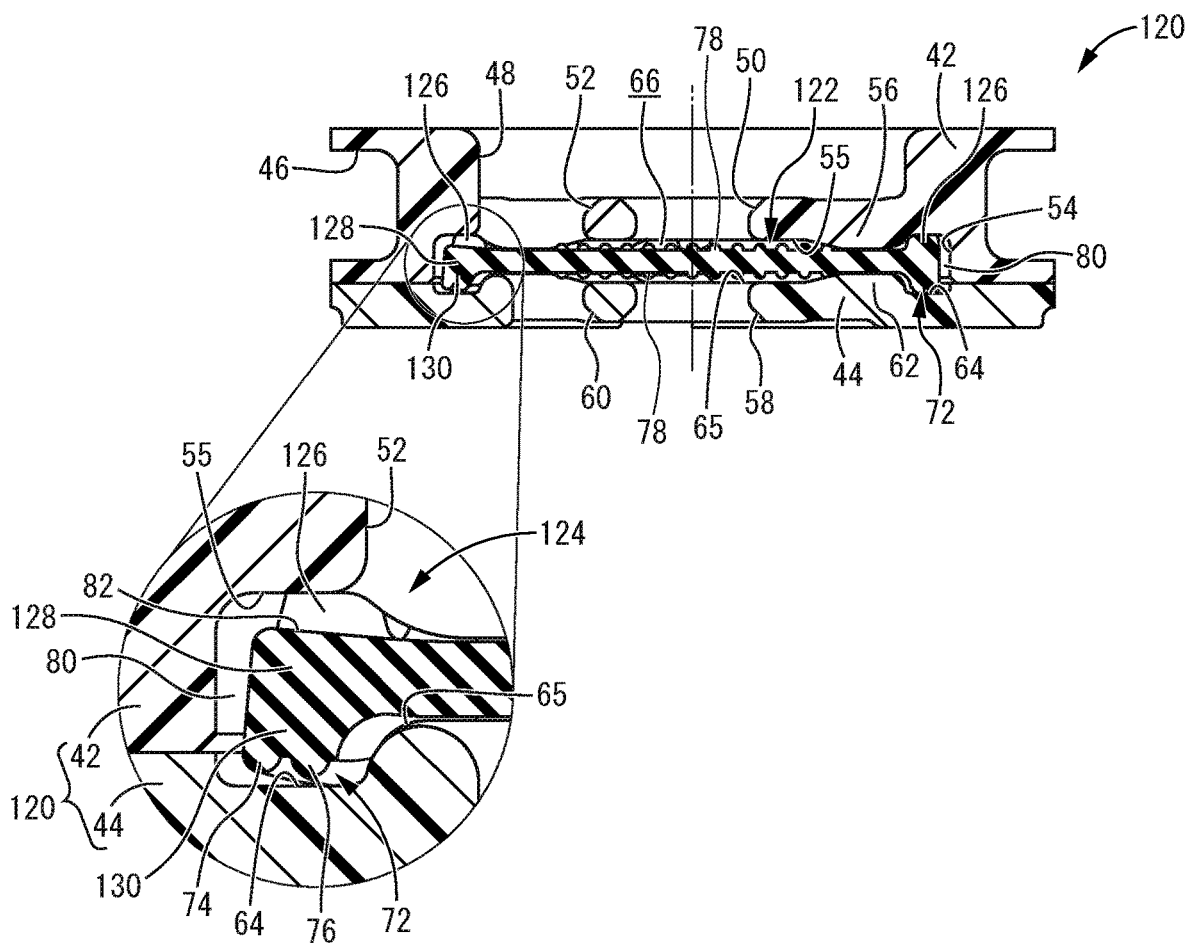
FIG. 9 is a cross sectional view showing a partition of an engine mount as a third practical embodiment of the present disclosure with a relief passage shown in a communicating state, which corresponds to FIG. 7 (corresponding to the cross section taken along line 1-1 of FIG. 3 of the first practical embodiment)

FIG. 9 depicts a partition 120 of an engine mount as a third practical embodiment of a fluid-filled vibration damping device constructed according to the present disclosure. In the fluid-filled vibration damping device of the present practical embodiment, the same structure as that of the first practical embodiment can be adopted other than the structure of the partition 120, and thus the illustration is omitted. The shapes or the like of the partition 120 and a movable film 122 housed inside the partition 120 are also the same as those of the partition 40 and the movable film 68 in the first practical embodiment. However, regarding the movable film 122 in the present practical embodiment, for example, the deformation rigidity at each portion or the like is made different from that of the movable film 68 in the first practical embodiment. With this configuration, in the present practical embodiment, a relief passage 124 is configured to be manifested in a mode different from that of the first practical embodiment.

Specifically, for example, in the first practical embodiment, by changing and adjusting the material, size, and compression rate in the mounted state etc. of the movable film 68, the elastic protrusions 70, and the like, the elastic protrusions 70 easily undergo compressive deformation and the outer peripheral end of the movable film 68 is raised from the seal contact part 64 throughout its entirety to manifest the relief passage 94. However, in the present practical embodiment, elastic deformation characteristics of the movable film 122 including elastic protrusions 126 are made different from those in the first practical embodiment.

Figure 10:
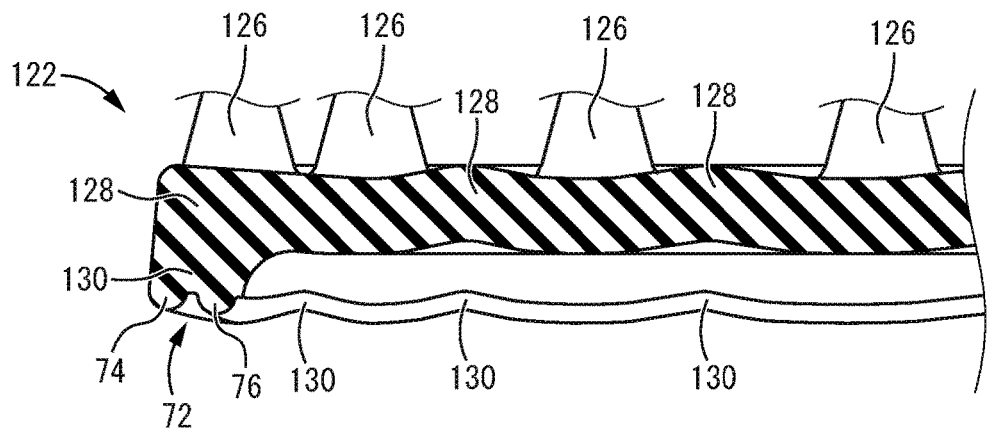
FIG. 10 is a cross sectional view showing a movable film arranged inside the partition shown in FIG. 9 with the partition removed, in order to explain a mode of deformation of the movable film.

In the present practical embodiment, elastic deformation, which is to be manifested when the opposite surfaces of the movable film 122 are subjected to a relative pressure differential, is likely to be manifested as elastic deformation of the surface of the movable film 122 in the direction of flexure, and is less likely to be manifested as compressive deformation of the elastic protrusions 126 in the direction of protrusion. Therefore, for example, when the internal pressure of the pressure receiving chamber 84 drops, due to the action of the relative internal pressure differential arising between the pressure receiving chamber 84 and the equilibrium chamber 86, a force toward the upper side acts on the movable film 122. Then, as shown in FIG. 9, the portions of the outer peripheral end of the movable film 122 where the elastic protrusions 126 are not provided (namely, the middle portions between the circumferentially adjacent elastic protrusions 126, 126 to which a deformation restraining force exerted by the elastic protrusions 126 is less likely to be applied) undergo elastically flexural deformation so as to be raised upward. The movable film 122 in such a deformed state is shown in FIG. 10. In FIG. 10, illustration of the cushion projections 78 is omitted.

That is, as shown in FIG. 9, at the portions where the elastic protrusions 126 are formed in the outer peripheral end of the movable film 122, the elastic protrusions 126 serving as a contact part are in contact with the pressure receiving chamber 84-side wall inner surface (the first wall inner surface 55) of the housing space 66, while the sealing part 72 is in contact with the equilibrium chamber 86-side wall inner surface (the second wall inner surface 65) of the housing space 66 (see the right side of FIG. 9). On the other hand, as shown in FIG. 10, circumferentially between the elastic protrusions 126, 126 at the outer peripheral end of the movable film 122, the sealing part 72 is deformed so as to be separated upward from the equilibrium chamber 86-side wall inner surface (the second wall inner surface 65) in the housing space 66. In this way, by deformed portions 128, which are deformed upward, being provided circumferentially between the elastic protrusions 126, 126 at the outer peripheral end of the movable film 122, the sealing part 72 is provided with raised portions 130 raised from the second wall inner surface 65 at the circumferential positions corresponding to the deformed portions 128. At the positions where the raised portions 130 are formed, the contact of the sealing part 72 with the seal contact part 64 is released, so that the gap 80 and the equilibrium chamber 86 are held in communication with each other through a space created by the raised portions 130.

As described above, in the present practical embodiment, the space through which the gap 80 and the equilibrium chamber 86 are held in communication is provided at the same circumferential position as the circumferential position circumferentially between the elastic protrusions 126, 126, and the said space is provided intermittently over the entire circumference in the circumferential direction. With this configuration, the pressure receiving chamber 84 and the equilibrium chamber 86 are held in communication through the relief passage 124 including the gap 80 and the communication passage 82, thereby preventing generation of cavitation.

The engine mount of the present practical embodiment including the partition 120 having the above-mentioned structure can also exhibit the same effect as that of the first practical embodiment. In particular, unlike the first practical embodiment, even in the case where the deformation rigidity of the elastic protrusion 126 is relatively larger than that of the movable film 122, the portions circumferentially between the elastic protrusions 126, 126 at the outer peripheral end of the movable film 122 (the deformed portions 128) are deformed to provide the raised portions 130 in the sealing part 72, thereby bringing the relief passage 124 into the communicating state.

While the present disclosure has been described in detail hereinabove in terms of the practical embodiments, the disclosure is not limited by the specific description thereof. For example, the elastic protrusions 70 may have a certain length in the circumferential direction, and may have a shape that continuously extends in the circumferential direction with a predetermined length. Moreover, the elastic protrusions may also be formed by, for example, an annular ridge being provided with a plurality of partial grooves in the circumferential direction. The portions circumferentially between the said grooves serve as the elastic protrusions.

The through hole connecting the pressure receiving chamber 84 and the housing space 66 does not have to include the first central through hole 50 and the first outer peripheral through holes 52, but may include, for example, only the first outer peripheral through holes 52. The through hole connecting the equilibrium chamber 86 and the housing space 66 does not have to include the second central through hole 58 and the second outer peripheral through holes 60, but may include, for example, only the second outer peripheral through holes 60.

The specific sealing structure provided by the sealing part being pressed against the seal contact part is not particularly limited as long as the structure provides a fluid-tight sealing between the sealing part and the seal contact part. Specifically, for example, it would also be acceptable that the contact surface of the sealing part being in contact with the seal contact part is a flat surface, and a seal projection projecting from the seal contact part continuously in the circumferential direction is pressed against the flat surface of the sealing part, so as to provide a sealing between the sealing part and the seal contact part. Besides, as long as the fluidtightness can be reliably obtained, the contact surfaces of both the sealing part and the seal contact part may be flat surfaces.

Furthermore, the portion to be deformed, the specific deformation mode of the movable film, and the like are not limited. For example, it would also be possible that the central portion of the movable film is deformed, and the deformation is transmitted to the outer peripheral end so that the sealing part at the outer peripheral end of the movable film is separated from the seal contact part of the second partition plate, whereby the pressure receiving chamber and the equilibrium chamber are held in communication by the relief passage. In the fluid-filled vibration damping device according to the present disclosure, the deformation rigidity and the like of the movable film and the elastic protrusion are not limited including the size, shape, and the like. Also, no limitation is imposed as to the deformation mode of the movable film and the elastic protrusion when the internal pressure of the pressure receiving chamber drops. Therefore, it is possible to freely design the shape of the movable film depending on the desired vibration damping characteristics and the like, and the present disclosure is able to provide a fluid-filled vibration damping device having a high degree of freedom in design.

In the third practical embodiment, when the internal pressure of the pressure receiving chamber 84 drops and a force toward the upper side acts on the movable film 68, not only the deformed portions 128 but also the elastic protrusions 126 may be sufficiently compressed in the vertical direction by being pressed against the first partition plate 42. That is, for the space between the sealing part 72 and the seal contact part 64, it would also be acceptable to adopt a mode in which the space has the annular portion over the entire circumference in the circumferential direction, while the vertical dimension of the space is increased at the position where the raised portions 130 are formed (approximately the center between the circumferentially adjacent elastic protrusions 126, 126). Namely, the said space may adopt such a mode as to combine the first practical embodiment and the third practical embodiment (the mode in which the size of the manifested space varies in the circumferential direction).

What is claimed is:

1. A fluid-filled vibration damping device comprising:
a pressure receiving chamber;
an equilibrium chamber;
a partition partitioning the pressure receiving chamber and the equilibrium chamber; and
a movable film within a housing space in the partition, an outer peripheral end of the movable film including
a contact part in contact with a pressure receiving chamber-side wall inner surface of the housing space partially in a circumferential direction, and
a sealing part in contact with an equilibrium chamber-side wall inner surface of the housing space over an entire circumference, wherein
the outer peripheral end of the movable film is supported by the partition,
a gap is between an outer circumferential surface of the movable film and an inner circumferential surface of the housing space that are opposed to each other,
in the outer peripheral end of the movable film, communication passages communicating with the gap are at a position away from the contact part in contact with the pressure receiving chamber-side wall inner surface of the housing space, and
the contact part is constituted by a plurality of elastic protrusions arranged in the circumferential direction of the outer peripheral end of the movable film while spaced apart from each other in the circumferential direction, each of the elastic protrusions protruding toward a side of the pressure receiving chamber with a circular cross section while having a tapered shape,
in the outer peripheral end of the movable film, protruding ends of the elastic protrusions are pressed against the pressure receiving chamber-side wall inner surface of the housing space, while the communication passages are constituted by a plurality of empty spaces maintained circumferentially between the elastic protrusions adjacent to each other in the circumferential direction, when, based on a relative internal pressure differential arising between the pressure receiving chamber and the equilibrium chamber, a force toward the pressure receiving chamber side acts on the movable film, the outer peripheral end of the movable film is configured to be displaced toward the pressure receiving chamber side due to compressed deformation of the elastic protrusions so that the sealing part is separated from the equilibrium chamber-side wall inner surface of the housing space such that a relief passage through which the pressure receiving chamber and the equilibrium chamber are held in communication is formed including the gap and the communication passage, and the gap between the outer circumferential surface of the movable film and the inner circumferential surface of the housing space is an annular gap extending entirely in the circumferential direction.

2. The fluid-filled vibration damping device according to claim 1, wherein due to the pressure differential arising between the pressure receiving chamber and the equilibrium chamber acting on the movable film, the sealing part of the outer peripheral end of the movable film is configured to be separated from the equilibrium chamber-side wall inner surface of the housing space circumferentially between the elastic protrusions such that the relief passage is manifested while maintaining contact between the pressure receiving chamber-side wall inner surface and the elastic protrusions and contact between the equilibrium chamber-side wall inner surface and the sealing part in the housing space at portions where the elastic protrusions are formed.

3. The fluid-filled vibration damping device according to claim 1, wherein the elastic protrusions have a tapered shape contracting toward a protruding distal end.

4. The fluid-filled vibration damping device according to claim 1, wherein a protruding distal end face of the elastic protrusions comprises a spherical cap-shaped curved surface.

5. The fluid-filled vibration damping device according to claim 1, wherein the partition includes a plurality of concave grooves opening onto an outer peripheral portion of the pressure receiving chamber-side wall inner surface in the housing space, the outer peripheral end of the movable film and the pressure receiving chamber-side wall inner surface of the housing space are in contact with each other at a portion circumferentially away from the concave grooves, and the communication passage is formed by the concave grooves.

6. The fluid-filled vibration damping device according to claim 1, wherein the outer peripheral end of the movable film includes a seal lip that protrudes toward a side of the equilibrium chamber and is continuous over the entire circumference, and the seal lip is in contact with the equilibrium chamber-side wall inner surface of the housing space over the entire circumference.

7. The fluid-filled vibration damping device according to claim 1, wherein due to the compressed deformation of the elastic protrusions, the outer peripheral end of the movable film is configured to be displaced toward the pressure receiving chamber side so that the sealing part is separated from the equilibrium chamber-side wall inner surface of the housing space over an entire circumference of the equilibrium chamber-side wall inner surface of the housing space.

8. A fluid-filled vibration damping device comprising:

a pressure receiving chamber;

an equilibrium chamber;

a partition partitioning the pressure receiving chamber and the equilibrium chamber; and a movable film within a housing space in the partition, an outer peripheral end of the movable film including a contact part in contact with a pressure receiving chamber-side wall inner surface of the housing space partially in a circumferential direction, and a sealing part in contact with an equilibrium chamber-side wall inner surface of the housing space over an entire circumference, wherein the outer peripheral end of the movable film is supported by the partition, a gap is between an outer circumferential surface of the movable film and an inner circumferential surface of the housing space that are opposed to each other, in the outer peripheral end of the movable film, communication passages communicating with the gap are at a position away from the contact part in contact with the pressure receiving chamber-side wall inner surface of the housing space, and the contact part is constituted by a plurality of elastic protrusions arranged in the circumferential direction of the outer peripheral end of the movable film while spaced apart from each other in the circumferential direction, each of the elastic protrusions protruding toward a side of the pressure receiving chamber with a circular cross section while having a tapered shape, in the outer peripheral end of the movable film, protruding ends of the elastic protrusions are pressed against the pressure receiving chamber-side wall inner surface of the housing space, while the communication passages are constituted by a plurality of empty spaces maintained circumferentially between the elastic protrusions adjacent to each other in the circumferential direction, when, based on a relative internal pressure differential arising between the pressure receiving chamber and the equilibrium chamber, a force toward the pressure receiving chamber side acts on the movable film, the outer peripheral end of the movable film is configured to be displaced toward the pressure receiving chamber side due to compressed deformation of the elastic protrusions so that the sealing part is separated from the equilibrium chamber-side wall inner surface of the housing space such that a relief passage through which the pressure receiving chamber and the equilibrium chamber are held in communication is formed including the gap and the communication passage, and wherein due to the compressed deformation of the elastic protrusions, the outer peripheral end of the movable film is configured to be displaced toward the pressure receiving chamber side so that the sealing part is separated from the equilibrium chamber-side wall inner surface of the housing space over an entire circumference of the equilibrium chamber-side wall inner surface of the housing space.

* * * * *